OR    3,932,024

United States Patent [19]
Yaguchi et al.

[11] 3,932,024
[45] Jan. 13, 1976

[54] ELECTRO-OPTICAL DEVICES

[75] Inventors: Masachika Yaguchi, Yokohama; Shigetaro Furuta, Fujisawa, both of Japan

[73] Assignee: Dai Nippon Toryo Kabushiki Kaisha, Osaka, Japan

[22] Filed: Aug. 16, 1973

[21] Appl. No.: 389,072

Related U.S. Application Data

[62] Division of Ser. No. 281,093, Aug. 16, 1972, abandoned.

[52] U.S. Cl. .......................................... 350/160 LC
[51] Int. Cl.² .............................................. G02F 1/13
[58] Field of Search .............................. 350/160 LC

[56] References Cited
UNITED STATES PATENTS

| | | | |
|---|---|---|---|
| 2,387,745 | 10/1945 | Colbert et al. ...................... 350/288 |
| 3,600,060 | 8/1971 | Churchill et al. ............... 350/160 LC |
| 3,614,210 | 10/1971 | Caplan ................................. 350/278 |
| 3,748,017 | 7/1973 | Yamamura et al. ............ 350/160 LC |
| 3,748,018 | 7/1973 | Borden .......................... 350/160 LC |
| 3,751,137 | 8/1973 | Fitzgibbons et al. .......... 350/160 LC |

*Primary Examiner*—Edward S. Bauer
*Attorney, Agent, or Firm*—Sughrue, Rothwell, Mion & Zinn

[57] ABSTRACT

In a liquid crystal display device comprising a pair of opposed electrode-mounted plates and a nematic liquid crystal layer, the electrode terminals are mounted on one plate by transferring the connection of one electrode to the opposite plate without directly contacting the liquid crystal material by interposing an electrically conductive material between the corresponding electrode terminal and the one electrode. In accordance with changes of environment, distinct patterns are obtained by making the front electrode of the liquid crystal display element transparent and the back electrode thereof a partial light-transmissive, mirror-like plane. The life of the liquid crystal element under application of D.C. field is increased by using titanium, zirconium and palladium as an essential component of the negative electrode of said element.

2 Claims, 10 Drawing Figures

ELECTRO-OPTICAL DEVICES

CROSS-REFERENCE TO RELATED APPLICATION

This application is a division of co-pending application Ser. No. 281,093, filed Aug. 16, 1972, and now abandoned by Masachika Yaguichi and Shigetaro Furuta for "Electro-Optical Devices".

BACKGROUND OF THE INVENTION

Field of the Invention:

The present invention relates generally to improved nematic liquid crystal elements and, more particularly, to such elements consisting of two parallel opposed plates, electrodes on the inner faces of each of the plates, and a thin nematic liquid crystal layer disposed between the plates.

Description of the Prior Art:

Recently, nematic liquid crystal display elements (hereinafter referred to merely as an "element") have been utilized as display elements and light modulation elements by causing the nematic liquid crystal (hereinafter referred to merely as "liquid crystal") to scatter light upon the application of an electrical field, thereby forming various patterns. These elements and display devices, and liquid crystal compounds used therein, are disclosed, for example, in U.S. Pat. Nos. 3,322,485 and 3,499,702. A fundamental structure of the element, a fundamental wiring for applying the field to the element, and types of electrode materials of the element are disclosed in these U.S. Patents. In the case where the element is incorporated in a practical device or equipment, the element is subject to various conditions. For example, the ease with which the element may be incorporated in the equipment depends on the space occupied by the element, the position the element is to be mounted, the positions of connecting wires, and methods used for connecting the wires. Moreover, the light rays are directed on the element to make patterns obvious when an electric field is applied to the liquid crystal layer, but it is influenced by the quantity of the light reflection and light transmittance of the electrode films. Furthermore, in the past the elements were driven by the application of an A.C. field to prolong the life of the element. The use of a D.C. field is advantageous with respect to the life of the associated circuits and also permits the use of a battery; however, the prior art has not solved the problem of prolonging the life of the element when D.C. is used.

When incorporating an element in practical equipment, the wiring between the element and equipment can be effectively carried out by mounting all of the electrode terminals on the inner face of one plate. In the case of the above mentioned U.S. patents, where the electrodes are crossed, the plates are shifted relative to each other and the electrode terminals are mounted on separate levels (namely, not being on the same level and parallel to each other) and wires extending in different directions connect the terminal to driving equipment; however, there are practical disadvantages of such a technique, as follows:

1. Because of the terminals being positioned on both plates at different levels and directions, the total package size for the element becomes large due to the shifted portions of the plate; namely, terminal areas are necessary for connections, and they occupy additional space, as compared with the case in which the terminals are positioned on the same plate.

2. When incorporating the element in equipment, the wiring from the driving equipment or circuit to terminals becomes complicated because of connections in two directions. The use of connectors requires two members and is therefore more expensive even when the terminal member is the same.

3. It is necessary to determine a contact position of the connectors and sockets twice and, further, mounting operations and connections increase. Moreover, even when electrode terminals are mounted on the same side on the inner face of each plate, connecting lead wires, lead frames or connectors to each of two opposing electrodes is extremely difficult because the space between two plates of the element is within the order of 5 to 50 $\mu$ in practice. Therefore, all of the electrode terminals should be mounted on one plate. To effect this purpose, the electrode terminal which is insulated from the other electrode on one plate is mounted on the edge of the said plate, and the electrode which is partially opposite to the said insulated electrode terminal is mounted on the other plate. Interposed between the electrode terminal on one plate and the electrode on the other plate is a metallic foil, such as aluminum foil, equal in thickness to the insulating spacer or several microns thicker than it or, in the alternative, a coating of electrically conductive paste over a portion of the insulating spacer is to provide position-transference of the electrode terminal (hereafter referred to merely as the "transfer connection").

However, the above connecting method has the following disadvantages and therefore is extremely low in the electrical reliability and often yields failures:

1. As the liquid crystal penetrates into minute apertures between the metallic foil and the electrode, insulation between them or increase in electrical resistance due to decrease of contact area of the metallic foil with the electrode occurs. Therefore, the desired results cannot be attained.

2. The thickness of a liquid crystal layer cannot be arbitrarily selected because a thickness of the metallic foil must be equal to that of the spacer or slightly thicker than the latter.

3. Where the transfer area, namely the area of an electrode terminal to which a transfer connection is to be made, is small, the interposing of the foil is quite difficult.

4. As the interposed foil is not reliably fixed and may shift in the liquid crystal, it is apt to move from a position at which the transfer connection of an electrode terminal is effected and to contact with other electrodes, thereby causing a short or cross charging effect or not effectively performing the connection.

5. There are some difficulties in manufacture in that the foil must be interposed between two electrodes before filling the liquid crystal.

6. Manufacture of the element needs a skilled worker.

Also, in the case where an electrically conductive paste is used for the metallic foil, there are the following disadvantages:

1. The conductive paste is apt to dissolve in the liquid crystal because of directly coming into contact therewith and disperse therein thereby causing a short.

2. The dissolution of the conductive paste affects the property of the liquid crystal.

3. There are some difficulties in manufacture in that the conductive paste must be coated with the uniform thickness on the given small area.

4. In manufacturing the element, it is necessary to pile electrode patterns mounted on the plates opposite to each other simultaneously with coating the paste which requires a great deal of skill.

On the other hand, as the liquid crystal itself does not emit light by the application of an electrical field or current, there is need to utilize a light source, such as daylight, room light or a spot light when incorporating the element to the equipment. In such an element, a plate and electrode on the front side thereof must necessarily be transparent, while a plate and electrode on the back side thereof may be transparent or reflective. The term "the front" used hereinafter in relation to a pair of plates of the element and an electrode mounted on the inner face of each of the plates is referred to as designating the plate mounted electrode directed to an observer side and the term "the back" as the plate mounted electrode positioned opposite to the observer side.

Transparent electrodes are, for example, obtained by vacuum depositing, for instance, tin oxide, indium oxide or tantalum on a transparent plate such as glass plate, while reflective electrodes are, for example, obtained by vacuum depositing, plate or printing a metal such as chromium, nickel, copper, lead, silver, gold aluminum, titanium or an alloy such as Inconel or a glass plate, ceramic plate or plastic plate. When the incident light is scattered by the liquid crystal layer under the application of the field, a portion of the light passes through the light scattering area, but in the case of using a reflective electrode as the back, this portion of the light is reflected through the scattering area, so that the contrast increases.

On the other hand, in the case of using a transparent electrode mounted on a transparent plate as the back, the light scattering by the liquid crystal is inferior to that in the reflective electrode in contrast and it is difficult to observe. Therefore, increase of contrast is effected by providing a source of light to the rear on the inside of an element-incorporated device and emitting the light at the proper angle.

Thus, in order to have the observer distinguish patterns, the light must be directed onto the element from the observer side when using the reflective electrode as the back, while in the case of using the transparent electrode as the back, the light must be emitted from the rear (namely opposite to the observer side). However, in the case of an element wherein the back is of a transparent electrode, a source of light is provided to the rear on the inside of the device as mentioned above and there is always need to turn on the light during operation of the element. Accordingly, there are economic disadvantages in that the source of light needs a great deal of energy and the transparent electrode is relatively expensive as compared with the reflective electrode.

Next, in the case of an element wherein the back is of a reflective electrode, if it is attempted to obtain an excellent contrast with daylight or room light only, the element must be observed in bright surroundings, if possible. But, where the surrounding is dark, it is impossible to increase the contrast. Accordingly, an illuminator is provided to obtain the required contrast to the front of the element. However, it is necessary to provide a space for receiving the illuminator to the front in the inside of the device, namely to the observer side of the element and therefore it is economically disadvantageous in that the size of the device itself becomes too large. Moreover, because of the need of housing for receiving the illuminator, the observation angle is limited, and the external light rays are obstructed by it.

When incorporating a liquid crystal element filled with a thin liquid crystal layer between a pair of electrodes into a device to be used in practice, practical problems of the life of the element become most important. The liquid crystal causes light scattering under the application of either direct current or alternating current voltages above a threshold value.

On the other hand, from the aspects of a circuit for driving the element or costs thereof the application of D.C. or a D.C. pulse field is quite desirable. The advantages are that the element can be driven with low voltages and also that the low consumption of power are compatible with portable instruments utilizing a battery. However, when the element is driven under the application of D.C. or a D.C. pulse field, particularly in the initial step of the application, foams emerge in the element and the liquid crystal itself turns yellow thereby becoming impossible to use. In the case that an electrode of the generally used metals, such as aluminum, chronium, copper, gold or silver is utilized as a positive electrode under the application of D.C. field, the resulting anodic oxidation and effluence of the metals have a bad influence upon the liquid crystal, and also the electrode is often peeled off. The electrode of the above metals can be used as a negative electrode only in order to prevent these disadvantages although it is of no use to prevent emergence of foams and yellowing of the liquid crystal. Also, even when the negative electrode is made from metal oxides such as tin oxide or indium oxide, the foaming or yellowing occurs. These drawbacks, namely the emergence of foams and the yellowing of the liquid crystal have been considered due to impurities present in the liquid crystal or properties of the liquid crystal itself, but this has not been made clear yet. Introductions of a novel additive to the liquid crystal or the synthesis and improvement of the liquid crystal have been studies, but the useful ones have not as yet been found.

SUMMARY OF THE INVENTION

It is, therefore, an object of the present invention to provide a liquid crystal display element composed by a pair of electrodes and a thin liquid crystal layer between them which features simplicity of incorporating the element to a driving equipment, easiness of manufacturing the element and high electrical reliability in use over a long time by transferring a terminal of the other electrode onto the same plane as that of one electrode-mounted plate without coming into contact with the liquid crystal.

Another object of the invention is to provide a liquid crystal element capable of indicating obvious patterns with excellent contrast in accordance with changes in the environment with or without lighting a light source mounted in a device by using an electrode film having a specific light transmittance.

Still another object of the invention is to provide a liquid crystal element capable of remarkably increasing the life thereof by using a specific conductive film for a specific electrode under the application of direct current field.

The foregoing and other objects of the invention are attained in a liquid crystal element composed of a pair of opposite electrode-mounted plates and a thin liquid crystal layer between them by providing an improved structure having a terminal of the other electrode on the same plane as one electrode-mounted plate, which comprises positioning on an edge of one electrode-mounted plate an electrode terminal insulated from the electrode on one said plate and interposing an electro-conductive material between the said electrode terminal and an electrode end on a cut edge of the other electrode-mounted plate opposite to the said edge of one electrode-mounted plate.

Another aspect of the invention is directed to an improved liquid crystal element characterized in that the front electrode of a liquid crystal element is transparent and the back electrode is of reflective materials with a mirror-like plane reflecting a portion of the incident light rays.

Still another aspect of the present invention is directed to an improved liquid crystal element characterized by a negative electrode in contact with a liquid crystal and essentially consists of titanium, zirconium or palladium.

DETAILED DESCRIPTION OF THE PREFERRED EMBODIMENTS

Figure 1:
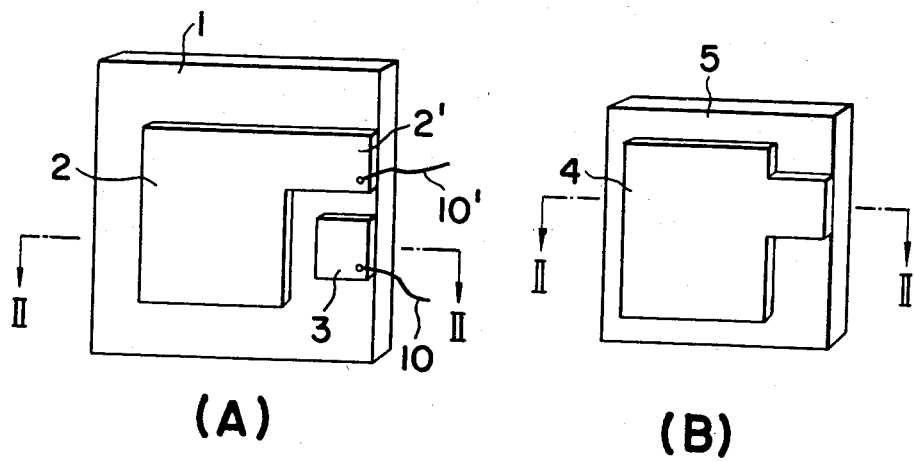
FIG. 1-A and FiG. 1-B represent a plane view of each of the electrode-mounted plates constituting an element.
Figure 2:
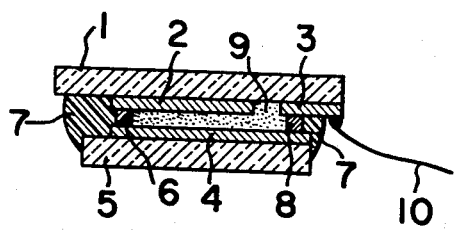
FIG. 2 represents a sectional view of an element filled with a liquid crystal between two electrode-mounted plates as indicated in FIG. 1-A and FIG. 1-B positioned opposite each other, along line II — II of FIGS. 1-A and 1-B.

As shown in FIG. 2, a nematic liquid crystal display element is formed by positioning two electrode-mounted plates, as indicated in FIGS. 1-A and 1-B opposite to each other filling the space between them with a liquid crystal. Transparent electrodes 2 and 3 are mounted on plate 1, and beside an electrode terminal 2', electrode 3 insulated therefrom is used as a terminal. Transparent or reflective electrode 4 is mounted on plate 5. Insulating spacer 6 is interposed between two plates 1 and 5, and liquid crystal layer 9 fills the space between plates 1 and 5. The element is completed by sealing material 7 between plates 1 and 5. Lead wires or lead frames or connectors 10 and 10' are connected to the terminals 3 and 2' respectively. Numeral 8 represents a conductive metal foil such as aluminum foil or a dried coating of a conductive paste. As shown in FIG. 2, the transfer connection of electrode terminals has been effected by interposing metal foil 8 equal to the thickness of insulating spacer 6, or several microns thicker, or coating a conductive paste between electrodes 3 and 4 thereby, besides the connection of lead wire 10' to electrode terminal 2', lead wire 10 is connected to the other electrode terminal 3 on the same face. However, as mentioned hereinbefore such a transference method has various disadvantages.

Figure 3:
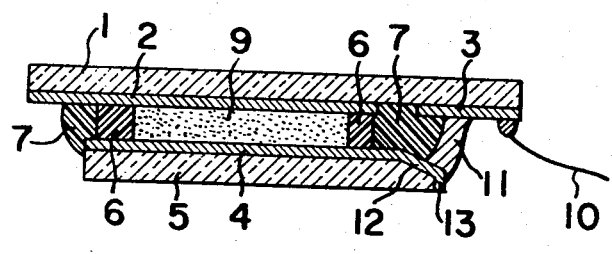
FIG. 3 represents a longitudinal sectional view of a liquid crystal element of an embodiment of the element according to the present invention.

The preferred embodiment of the element of the present invention is illustrated in FIG. 3. Numeral 11 represents an electro-conductive material, for example a conductive coating, or filler comprising a conductive paste or soft solder. An edge of plate 5 opposite to the electrode-transferred area on plate 1 or electrode terminal 3 has face 12 cut diagonally. Plane 13 is the initial cut edge of plate 5. Electrode 4 is extended on plate 5 to the diagonal plane 12 and, if necessary, to the perpendicular plane 13 to become an electrically continued form (hereinafter referred to as "continuous electrode"). As shown in FIG. 3 sealing material 7 is filled between plate 1 and plate 5 not to cover electrodes 3, 12 and/or 13, and then a conductive material 11, such as soft solder, is coated or dropped on the sealing material to form a conductive coating or filler between electrode 3 and electrodes 12 or 13 whereby the transfer connection of the electrode is effected. The procedure for mounting an electrode on plate 5 processed in the inclined plane as shown in FIG. 3 is the same as the case where an electrode is mounted on the planer plate as shown in FIG. 2 and does not need any additional manufacturing steps. Also, in case that a plurality of the patterns indicated in FIGS. 1-A and 1-B are mounted opposite one another in a linear array, the connection can be quite similarly affected. For example, when a plurality of the patterns indicated in FIG. 1-B are in an electrically insulated state separately mounted on the same plane, the connection can be effected to each of the corresponding electrode terminals. When it is intended to apply the field through only a transfer area by making a plurality of electrode patterns continuous electrically, the transfer connection can be effected at the same time to all of these electrodes my making electrodes on the inclined plane 12 or perpendicular plane 13 continuous electrically. (It is also naturally possible to mount the electrodes on a flat plane of plate 4 continuous electrically, but it does not present a good appearance.) Further, by mounting an electrode film over all the surface of planes 12 and 13, it is possible to transfer the electrode to any one of several transferring terminals on plate 1. If it is desired to make the above continued electrode film separate, the said electrode film can be easily cut by a knife edge or diamond cutter to the insulated state.

According to the present invention, the cut edge of plate 5 may be in any form of perpendicular, slope, circular arc, a portion of a polygon and others. Preferably, the cut edge is in the form of a slope or a portion of polygon as indicated in FIG. 3 or a circular arc, because it is possible to prevent the insulation or the increase in electrical resistance when mounting a continuous electrode. The liquid crystal used in the present invention is not restricted as far as it is a nematic liquid crystal compound possessing electro-optical properties. Examples of such compounds are, for example, disclosed in U.S. Pat. Nos. 3,322,485 and 3,499,702. Their mesomorphic ranges (temperature ranges necessary to exhibit a liquid crystal state) depend on types of the compounds. Preferably, the compounds exhibiting a liquid crystal state at the normal temperature are used in the present invention. It is possible for compounds having no mesomorphic range at the normal temperature to exhibit the liquid crystal state at the normal temperature by mixing two or more of them in a certain ratio. Accordingly, the liquid crystal can be used alone or in mixture.

According to the present invention, it is possible to transfer the connection of electrode terminals without using a metal foil and coming into contact with the liquid crystal and therefore there are the following advantages:

1. The transferring connection is surely attained and the electrical reliability is excellent; that is, there is no movement of a material coming into contact with the connecting area, and the transference can be certainly effected. As a result, failures in manufacture and in use decrease.

2. The conductive coating or filler for use in the transfer connection can be formed by mere coating or dropping of a conductive material so that the manufacture is simple and the failures in a conductive film are easily corrected. Moreover, the workers do not need to be highly skilled.

3. For example, as said before, in FIG. 3 when mounting an electrode film over both planes 12 and 13 of the cut edge, connection can be effected to any transfer terminal 3 on plate 1, and, further, the viewing area does not become obstructed but, rather, presents a good appearance.

4. It is possible to effect the electrode transfer connection either before or after injection of the liquid crystal; consequently, manufacture of the element is facilitated.

5. Limitations on the thickness of the film that were restricted by the aluminum foil are eliminated.

The position-transfer connection system for the electrode terminal according to the present invention is applicable not only to the liquid crystal element but also to electro-luminescent cells, plasma display panels, condensers and other devices which need two opposing electrodes with a narrow distance between them.

According to another aspect of the invention, a liquid crystal element is constituted by the front electrode which is transparent and the back electrode which is of a reflective material with a mirror-like plane reflecting a portion of incident light rays, as for example a so-called half-mirror having light transmittance preferably within the range of about 30 to 70%. The term "light transmittance" used herein means a rate of light transmission in relation to a glass without an electrode mounted thereon. When the light transmittance of the electrode is above about 70%, the pattern becomes unobvious because of a decrease in the reflection of the incident light rays on the observer side. On the other hand, when the light transmittance is lower than about 30%, it is difficult for the observer to distinguish the patterns because, when a source of light mounted to the rear on the inside of the device is provided, the quantity of the light rays therefrom to the observer side is reduced.

The materials of the back electrode used in the present invention are aluminum chromium, nickel, copper, gold, silver, titanium and the like. The back electrode is a general formed by vacuum depositing the metals on the glass plate. In this case, a half mirror having the transmittance within the above mentioned range is obtained by adjusting the vacuum-deposited film. The vacuum-deposited film may be in the form of a laminate of metals of two or more. The thickness of the vacuum-deposited film depends on the materials used. For example, with an aluminum film of the thickness in order of 2000A it is difficult to attain the above effects, whereas with a half mirror of the thickness in order of 500A the purpose can be attained sufficiently. Chromium, nickel, copper, gold and titanium can be similarly used by forming a film of the thickness in accordance with their transmittance characteristics.

Besides the so-called half mirror obtained by adjusting the thickness of the vacuum deposited film as mentioned above, the back electrode with a semi-transparent mirror-like plane according to the present invention includes one obtained by etching a vacuum deposited film of a perfect mirror type to form a great number of fine holes, for example, of 0.1mm in diameter (making the light transmittance per a unit of surface area about 40%). The semi-transparent mirror-like plane obtained thus has the advantages that the light transmittance can be more accurately controlled as compared with the half-mirror, and the back electrode reliability in conductivity is obtained. The above mentioned fine holes are not restricted to a round form and may be in any geometrical form of, for example, rectangle, ellipse, rhombus, arc and others. The fine holes can be also arrayed to form a proper macroscopic pattern.

Figure 4:
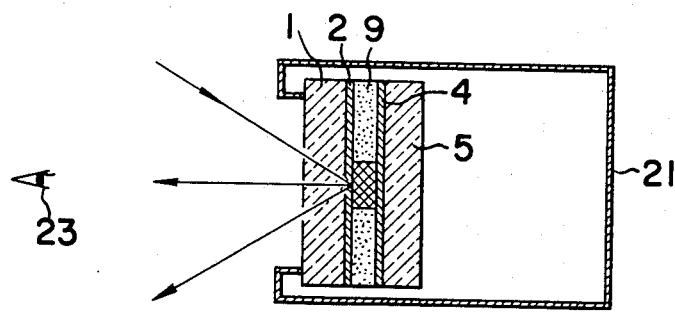
FIG. 4 and FIG. 5 represent sectional views of display devices assembled with an element wherein the front is a transparent electrode and the back a reflective electrode.
Figure 5:
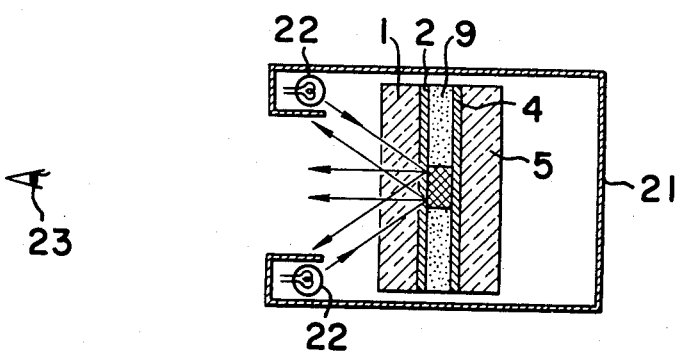
Figure 6:
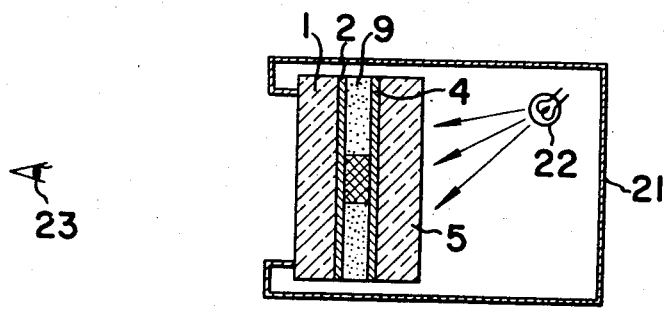
FIG. 6 represents a sectional view of a display device assembled with an element wherein both the front and the back are transparent electrodes.

Display devices 21 assembled with an element of which the front is a transparent electrode and the back is a reflective electrode are shown in FIGS. 4 and 5. Also, a display device 21 assembled with an element of which both the front and back are transparent electrodes is shown in FIG. 6. There are disadvantages that these elements could be utilized only under the specific conditions as mentioned hereinbefore.

Figure 7:
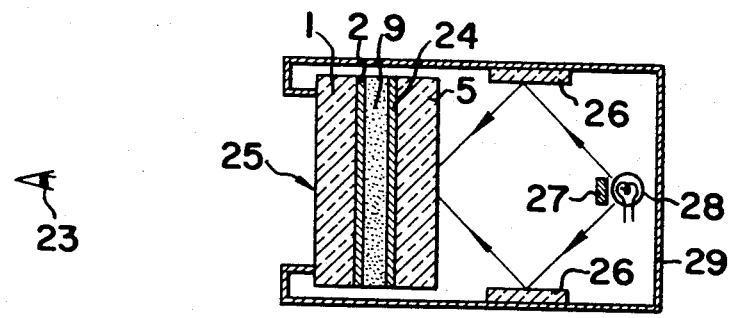
FIGS. 7, 8 and 9 represent sectional views of other embodiments of a display device assembled with an element according to the present invention.
Figure 8:
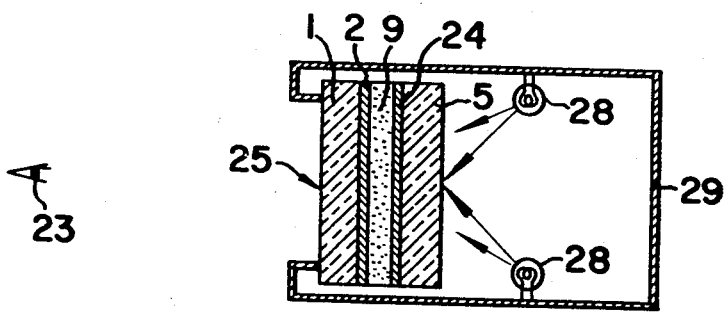
Figure 9:
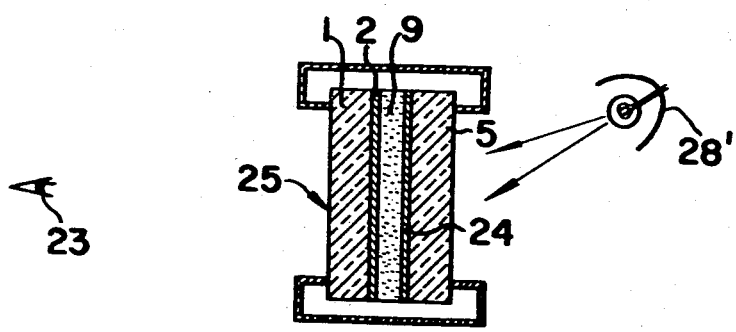

The drawings of from FIG. 7 to FIG. 9 show display devices assembled with an element embodying the present invention. Element 25 is composed of plate 1 having transparent electrode 2 mounted thereon and plate 5 having a semi-transparent electrode 24 mounted thereon. Devices 29, shown in FIGS. 7 and 8, are provided with a light source 28 to the rear in the inside thereof, and, moreover, reflective plates 26 and screening plate 27 may be provided as shown in FIG. 7. As shown in FIG. 9, an external light source 28' may be provided to the rear of the display device. When light from source 28 or 28' is directed on the back face of element 25 as indicated by the arrows, the position of the light source and the angle of the incident light should be selected so that a concentrated beam of light rays is incident on element 25.

When an element according to the present invention in which a semi-transparent mirror-like plane having both the light reflecting and transmitting properties is used as the back electrode, there is no need to turn on light source 28 or 28' if the external ambient light (for example, daylight, room light, etc.) are sufficiently bright. Light rays from source 28 or 28' are directed on the back face of element 25 only if the external light is not bright enough to present excellent contrast. Accordingly, an excellent contrast is always and economically obtained notwithstanding changes in the surrounding conditions.

According to still another aspect of the present invention, the emergence of gas under the application of a direct current or a direct current pulse field can be extremely reduced by using a conductive material essentially consisting of titanium, zirconium or palladium as a negative electrode of the element. Therefore, life of the element can be remarkably extended. Negative electrodes used in the present invention can be prepared by vacuum depositing titanium on a substrate or fixing or sticking a foil or plate of zirconium or palladium on the substrate to form the desired patterns or fixing together these materials and insulators in the block to form the desired patterns.

The present invention is illustrated by the following examples which should not be construed as restricting the present invention.

EXAMPLE 1

In FIG. 3 a float glass plate of 3mm in thickness was used as substrates 1 and 5. Substrate 5 was in advance processed so that the length of inclined plane 12 is 1.4mm (an angle of inclination of 4.5°). Electrodes 2 and 3 were made of tin oxide and a continuous electrode on substrade 5 were made from aluminum. The liquid crystal, N-(4-methoxybenzylidene)-(4'-butyl)aniline (MBBA) was sandwiched in between the electrodes to form a layer of about 20 $\mu$ in thickness.

Dotite (tradename by Fujikura Kasei Corp., Japan, an electrical conductive paste comprising an epoxy resin and silver powder) as a conductive material for use in the transfer connection was coated between electrode 3 and electrodes 12 and 13 to form a conductive film 11.

Consequent on the application of D.C. 20 volts between lead wires 10 and 10', there was no electrical failure.

EXAMPLE 2

An element of the same structure as Example 1 was made except that electrodes 2 and 3 were made of indium oxide and the continuous electrode was made from titanium.

The same effect as that of Example 1 was obtained.

EXAMPLE 3

An element of the same structure as Example 2 was made except that a continuous electrode made from aluminum was mounted on plate 5 of which the cut edge for the transfer connection area was a perpendicular.

The effect as mentioned in Example 1 was obtained.

EXAMPLE 4

An element was produced in the same procedure was Example 1 except that electrodes 2 and 3 were made of indium oxide and the continuous electrode was made from titanium.

The same effect as that of Example 1 was obtained. In this case an epoxy resin was further coated on conductive film 11 to protect the conductive portions from the exterior.

EXAMPLE 5

Each of eight in number of patterns 2 and 3 of a tin oxide electrode as indicated in FIG. 1-A was mounted on plate 1 electrically insulated from one another by photo-etching, while each of eight in number of pattern 4 of a continuous electrode of aluminum as indicated in FIG. 1-B was mounted on plate 5 electrically insulated from one another by photo-etching. In this case, each of patterns of FIG. 1-A is opposite to each of the corresponding patterns of FIG. 1-B. Eight transfer connections were effected by using a soft solder as the conductive material. Other conditions were the same as those of Example 1.

The same effect as that of Example 1 was obtained.

EXAMPLE 6

The element of the same structure as that of Example 3 was made except that the transfer connection areas were four in number and electrodes 2 and 3 were made of tin oxide while the continuous electrode was made from titanium.

The same effect as that of Example 1 was obtained.

EXAMPLE 7

An element consisting of two float glass plates, the front electrode on the inner face of one plate being made of indium oxide and the back electrode on the inner face of the other plate being an aluminum film of about 500A in thickness having a light transmittance of about 50%, is used in this example. MBBA was used as a liquid crystal and a thickness of the layer is about 20 $\mu$. The aluminum electrode had such an electrical conductivity as not at all affecting the driving of the element.

As shown in FIG. 7, an incandescent electric lamp of 20 watts as a light source was provided to the rear on the inside of a device. A potential of 20 volts D.C. was applied to the element. When observing the device in the bright external light without illumination by light source 28, the resulting contrast was slightly reduced as compared with the case of using a mirror plane of the light transmittance of 0% as the back electrode, but was superior as compared with the case of using a transparent electrode as the back. When lighting the rear lamp fully obvious contrasts were obtained even in the dark.

EXAMPLE 8

An element was produced having the same constitution as that of Example 7 except using a fluorescent lamp of 10 watts as the light source was used.

The same effect as that of Example 7 was attained.

EXAMPLE 9

The same element as that of Example 7 was made except using the same electrode transfer connection system as that of Example 1 was employed.

The same effect as that of Example 7 was obtained.

EXAMPLE 10

The same element as that of Example 7 was made except that the back electrode was made of titanium film of about 300A in thickness having a light transmittance of about 40% was used. When observing the element the resulting patterns were slightly unobvious as compared with the case of using a titanium electrode of the light transmittance of 0% as the back electrode, though the other effects were as mentioned in Example 7.

EXAMPLE 11

The same element as that of Example 10 was made except that the same electrode transfer connection system as that of Example 1 was employed.

The same effect as that of Example 10 was obtained.

EXAMPLE 12

An element was prepared in the same manner as Example 10 except that the front electrode was made of tin oxide and the electrode transfer connection was effected as mentioned in Example 3.

The same effect as that of Example 10 was obtained.

EXAMPLE 13

The procedure of Example 7 was repeated except using the same electrode transfer connection system as that of Example 3.

The same effect as that of Example 7 was obtained.

EXAMPLE 14

The procedure of Example 7 was repeated except using the same electrode transfer connection system as that of Example 1.

The same effect as that of Example 7 was obtained.

EXAMPLE 15

The back electrode was produced by photoetching an aluminum film of about 1,100A in thickness having a mirror-like plane of the light transmittance of 0% to form a great number of holes of 0.1 mm in diameter thereby making a light transmittance per unit area of about 50%.

An element was constituted in the same manner as Example 5. The test resulted in the same effect.

EXAMPLE 16

The procedure of Example 15 was repeated except using the same electrode transfer connection system as that of Example 1.

The same effect as that of Example 15 was obtained.

EXAMPLE 17

In an element filled with a liquid crystal, MBBA having a layer thickness of 12 $\mu$, a conductive coating of tin oxide was used for a positive electrode and the following metal coatings for a negative electrode. A life test of the element was measured under the application of 24 Volts D.C. The results are indicated below:

Table

| negative electrode | Al | Cu | Pb | An | Ni | Au | SnO$_2$ | Ti | Zr | Pd |
|---|---|---|---|---|---|---|---|---|---|---|
| life (hr.)* | 4 | 4 | 22 | 48 | 160 | 50 | 3 | >1000 | >1000 | >1000 |

*Time until the liquid crystal shows the emergence of foams and signs of yellowing.

The above table shows that the life was extremely extended by using titanium, zirconium or palladium as the component of the negative electrode.

We claim:

1. An optical display device comprising first and second transparent transposed plates, first and second electrodes mounted on the facing surfaces of said first and second plates, respectively, an insulating spacer interposed between said plates, a nematic liquid crystal filled between said first and second plates and within said insulating spacer, said first electrode being transparent and said second electrode being partially reflective having a light transmittance in the range of 30% to 70%, said second electrode being composed of an opaque reflective material with a plurality of fine holes formed therein, the number of holes being determined by the light transmittance desired, said optical display device being adapted to be energized by a D.C. source and wherein said first and second electrodes are a positive electrode and a negative electrode, respectively, said negative electrode comprising as an essential component titanium.

2. An optical display device comprising first and second transparent transposed plates, first and second electrodes mounted on the facing surfaces of said first and second plates, respectively, an insulating spacer interposed between said plates, a nematic liquid crystal filled between said first and second plates and within said insulating spacer, said first electrode being transparent and said second electrode being partially reflective having a light transmittance in the range of 30% to 70%, said second electrode being composed of an opaque reflective material with a plurality of fine holes formed therein, the number of holes being determined by the light transmittance desired, said optical display device being adapted to be energized by a D.C. source and said first and second electrodes are a positive electrode and a negative electrode, respectively, said negative electrode comprising as an essential component zirconium.

* * * * *

UNITED STATES PATENT AND TRADEMARK OFFICE
CERTIFICATE OF CORRECTION

PATENT NO. : 3,932,024

DATED : January 13, 1976

INVENTOR(S) : Masachiki YAGUCHI et al

It is certified that error appears in the above-identified patent and that said Letters Patent are hereby corrected as shown below:

IN THE HEADING:

ADD:

Foreign Application Priority Data

| August 18, 1971 | Japanese | 62343/71 |
| October 7, 1971 | Japanese | 78324/71 |
| January 24, 1972 | Japanese | 9524/72 |
| February 26, 1972 | Japanese | 23068/72 |

Signed and Sealed this sixth Day of April 1976

[SEAL]

Attest:

RUTH C. MASON
*Attesting Officer*

C. MARSHALL DANN
*Commissioner of Patents and Trademarks*